DIGITAL DEMODULATOR NETWORK

Filed Jan. 23, 1967

INVENTOR
NORMAN F. PRIEBE

BY Thomas J. Nikolai
ATTORNEY 3,488,600

DIGITAL DEMODULATOR NETWORK

Norman F. Priebe, Eagan Township, Dakota County, Minn., assignor to Sperry Rand Corporation, New York, N.Y., a corporation of Delaware Filed Jan. 23, 1967, Ser. No. 610,847
Int. Cl. H03k 3/78
U.S. Cl. 329—110 8 Claims

ABSTRACT OF THE DISCLOSURE

A circuit which employs digital logic and switching circuits for recovering binary data from a carrier wave which is phase modulated 180° by each transition of the data signal. The data is recovered by combining in a logical AND gate, the carrier wave with a replica of the carrier wave delayed for a period equal to ½ bit of the binary data. The resultant signals from the logic circuits represent data changes from "1" to "0" and from "0" to "1" and are used to trigger a bistable circuit to recover the data. The carrier wave is recovered for clocking purposes by combining in a logical AND gate, the data output from the bistable circuit with the received phase modulated carrier.

BACKGROUND OF THE INVENTION

This invention relates to a carrier wave receiver and more specifically to a carrier wave receiver which employs digital logic and switching circuits for recovering the binary data signal and clock signal from a phase modulated carrier wave.

Most prior art demodulators for phase-shift keyed or phase-modulated carrier wave signals employed to recover the information or data have utilized analog devices or have required precision oscillators and synchronizing circuits for producing a reference wave which is synchronized with the received carrier wave. For typical examples of such prior art arrangements, reference is made to U.S. Patents 3,234,465; 3,088,099; 3,238,459; 3,028,487; and 3,020,485, each of which includes as part of the demodulating network an oscillator or clock which must be carefully synchronized with the transmitted carrier in order to reconstruct the modulating data signal.

SUMMARY

The digital demodulator of the present invention utilizes digital type circuitry almost exclusively and eliminates the need for stable oscillators and synchronizing circuits and accordingly, provides a device which is substantially less expensive and more reliable than prior art arrangements. This invention provides at the receiving point, suitable circuits for filtering and shaping the received pulse phase modulated carrier wave to restore it to a pulse type wave form. The shaped phase modulated carrier is then fed into a signal delay device having a delay period approximately equal to one-half cycle of the carrier. The first coincidence circuit is provided which has as inputs the shaped received signal and the delayed receive signal. A second coincidence circuit receives as inputs the logical complement of the input signals to the first coincidence circuit. The outputs from the first and second coincidence circuits are fed to the CLEAR and SET terminals of a bistable flip-flop. Because of the manner in which the received and delayed phase modulated carrier wave and their complements are logically combined in the coincidence circuits, the first coincidence circuit produces a switching signal for the flip-flop each time a modulating signal changes from the logical "1" level to a logical "0" level, whereas the second coincidence circuit produces a switching signal to the flip-flop each time a modulating (data) signal changes from a logical "0" level to a logical "1" level. Hence, the signal appearing on one side of the flip-flop output constitutes the data signal itself. Because the "1" and "0" signals are recovered independently of each other, there is no phase ambiguity of the recovered data.

To recover the unmodulated carrier wave (clock signal) at the receiving point, a second pair of coincidence circuits are provided which logically combine the received and shaped phase modulated carrier wave with the data output from the flip-flop to yield an output signal of constant phase. Thus, it can be seen that the data and carrier are recovered at the receiving site without requiring a stable clocking oscillator and synchronizing network.

DESCRIPTION OF THE PREFERRED EMBODIMENT

Figure 1:
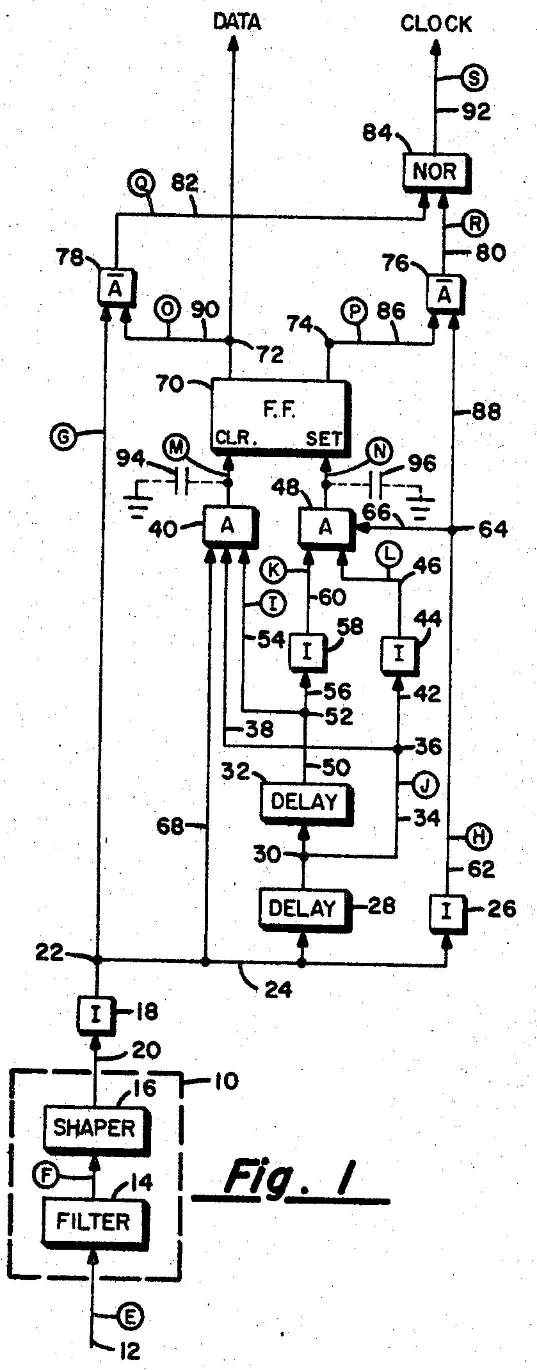
FIGURE 1 illustrates by means of a block diagram the preferred embodiment of the present invention.

Referring first to FIGURE 1, the digital demodulator of this invention comprises a signal receiving and shaping network of conventional design which is shown enclosed by dashed lines 10. It receives the transmitted phase-modulated carrier wave on input line 12. Included within the receiving and shaping network is a filter 14 which functions to remove any high frequency noise signals which may be present in the received modulated carrier signal. The output from the filter 14 is fed to a shaper network 16 which functions in a conventional manner to amplify and clip the received wave form to produce a pulse type waveform having sharp leading and trailing edges.

The output from the receiving and shaping network 10 is connected as an input to an inverter 18 which functions primarily to amplify the shaper output before driving the remaining circuits and to provide the logical complement of the signal appearing on its input conductor 20 at the output junction 22.

The junction 22 is connected by a conductor 24 to the input of a second inverter 26 and to the input of a first delay network 28. The output from delay element 28 is connected at junction 30 to the input terminal of a second delay network 32. The output signal from delay element 28 appearing at junction 30 is also applied by way of conductor 34 to a junction 36. The junction 36 is connected by a conductor 38 to a first input terminal of a coincidence gate 40. A conductor 42 connects the junction 36 to the input terminal of an inverter 44, the output of which is connected by way of a conductor 46 to a first input terminal of a second coincidence gate 48. The output signal from delay element 32 is applied by way of a conductor 50 to a junction point 52. From junction 52 a connection is made by way of a conductor 54 to a second input terminal of coincidence circuit 40 and by way of a conductor 56 to the input terminal of an inverter 58, the output of which is connected to a second input terminal of coincidence circuit 48 by way of conductor 60. The output from inverter 26 is connected by a conductor 62 to a junction 64. The junction 64 is connected by means of conductor 66 to a third input terminal of coincidence gate 48. The signal which appears at junction 22 passes by way of conductors 24 and 68 to the third input terminal of coincidence gate 40. The output from coincidence circuit 40 is connected to the CLEAR input terminal of a bistable flip-flop circuit 70. Likewise, the output from the coincidence circuit 48 is connected to the SET input terminal of flip-flop 70.

As will be explained more fully when the operation of the circuit is described, a replica of the data used to modulate the carrier wave at the transmitting site appears on the CLEAR output terminal 72 of the flip-flop 70. The complement of the data signal appears at the SET output terminal 74.

In order to reconstruct the carrier wave signal at the receiving site, the demodulator of FIGURE 1 also includes third and fourth coincidence circuits 76 and 78 each of which has a pair of input terminals and an output terminal. The output terminals of coincidence circuits 76 and 78 are respectively connected by conductors 80 and 82 to first and second inputs of an OR gate circuit 84. The first input to coincidence circuit 76 comes from the SET output terminal 70 by way of conductor 86 and the second input terminal of coincidence circuit 76 is connected to the junction 64 by way of conductor 88. The first input terminal of coincidence circuit 78 is connected to receive the output of inverter 18 which appears at the junction 22. The second input terminal of coincidence circuit 78 receives signals from the CLEAR output terminal 72 by way of a conductor 90. As will become evident when the operation of the demodulator circuit is considered, appearing on conductor 92 connected to the output terminal of OR circuit 84 is a signal train of constant phase having a frequency identical to the carrier signal generated at the transmitting site.

Now that the physical arrangement of the preferred embodiment has been described in detail, consideration will be given to the operation of the circuit.

OPERATION

Figure 2:
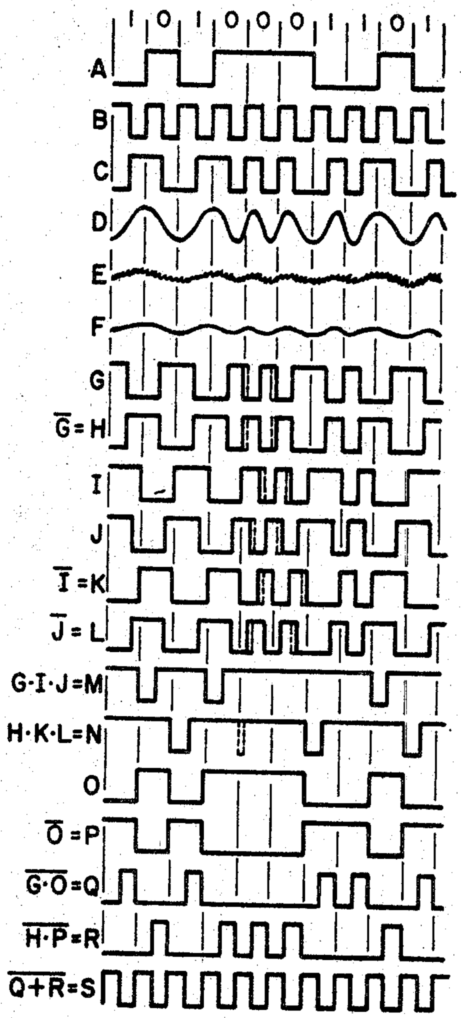
FIGURE 2 illustrates the wave forms obtained at various identified points in the circuit of FIGURE 1.

The operation of the preferred embodiment illustrated in FIGURE 1 can best be explained by referring to the waveforms shown in FIGURE 2. Where appropriate, the letters appearing at the left in FIGURE 2 to identify the various waveforms are also illustrated in the circuit of FIGURE 1 by circling the letter and providing the lead line to the point in the circuit where the waveform in question appears.

Waveform A in FIGURE 2 illustrates the data or modulating signal which is to be transmitted. It is represented in the so-called non-return to zero (NRZ) format and the particular wave form shown represents a serial train of the binary digits 1010001101. Waveform B represents the carrier wave generated at the transmitting site. It is to be noted that waveform B is a constant phase signal and is adjusted so that the bit rate in bits per second of the modulating signal (data signal) is approximately equal to the carrier frequency in cycles per second. For proper operation of the demodulator of this invention, it is necessary that the frequency of the carrier signal is not subject to change in transmission due to the Doppler effect to heterodyne translation error. In many present day communication systems this is not a stringent requirement on the system.

Waveform C illustrates the modulated carrier signal generated at the transmitting site. Note that the information content of this waveform is represented by a 180° phase shift on change of data. That is, whenever the information changes from the binary "zero" to a binary "one," the waveform undergoes a 180° phase shift. Similarly, when the information changes from a binary "one" to a binary "zero," a 180° phase shift occurs.

Waveform D in FIGURE 2 represents the transmitted signal which is applied to the communications media. This signal may be transmitted over wire, through the air, or recorded on a suitable recording medium.

Waveform E illustrates the modulated carrier wave as it is received at the input of the demodulator circuit of FIGURE 2. As is illustrated in FIGURE 2, waveform E has been seriously attenuated during transmission and has also picked up noise components which are superimposed on it. The waveform E is applied by way of conductor 12 to the filter network 14. Waveform F represents the output from the filter 14. It can be seen that this filter serves to remove the high frequency noise components from the received signal. After filtering, the received signal train is applied to the shaper circuit 16. The shaper circuit 16 may comprise suitable amplifying and clipping circuits for producing sharp leading and trailing edges on the input waveform so as to convert the applied signal to a pulse type waveform having excursions between two well defined amplitude levels. The output from the shaper 16 is applied by way of conductor 20 to a logical inverter stage 18.

Waveform G represents the output signal from inverter 18 appearing at junction 22. The signal train appearing at junction 22 is again inverted by the circuit 26 and applied by way of conductor 62 to the junction 64. The signal appearing on conductor 62 has the waveform identified by letter H in FIGURE 2.

The signal appearing at junction 22 is also applied by way of conductor 24 to the input of delay network 28. The value of the delay of network 28 is preferably set equal to ¼ of a bit period of the modulating signal or ¼ cycle of the unmodulated carrier wave signal. As will be shown hereinbelow, the use of a ¼ bit period delay yields higher margins against distortion errors. Waveform J in FIGURE 2 shows the shape of the signal train appearing in the output of the delay element 28. A second delay circuit 32 is connected to receive the signal appearing at the output of delay circuit 28. The value of the delay introduced by network 32 is also preferably equal to ¼ of a bit period of the modulating data signal or ¼ of a cycle of the unmodulated carrier signal. The total delay, therefore, for the signal in passing through delay elements 28 and 32 is approximately equal to ½ of a bit period of the modulating signal or ½ cycle of the unmodulated carrier signal. The waveform I of FIGURE 2 illustrates the shape and timing relationship of the signal appearing at junction 52 with respect to the output from the inverter circuit 18. A signal having the waveform I is applied by way of conductor 54 to a second input terminal of coincidence gate 40 and by way of conductor 56 and inverter 58 to the second input terminal of the coincidence circuit 48. A signal having waveform J appearing at junction 30 is applied by way of conductor 38 to a third input terminal of coincidence circuit 40 and by way of conductor 42 and inverter 44 to the third input terminal of coincidence circuit 48. Waveforms K and L illustrated in FIGURE 2 represent the signal trains I and J after being inverted by the circuits 58 and 44 respectively.

The coincidence circuits 40 and 48 are preferably logical AND gate circuits, many forms of which are well known in the art. In order for an AND gate to produce an output, it is necessary that the signals applied to the input thereof be simultaneously of the same phase and voltage level. It can be seen, then, that coincidence circuit 40 will produce an output signal only when the signal appearing on line 68, 54, and 38 are simultaneously of the same phase and voltage level. The waveform M shown in FIGURE 2 illustrates the output from the coincidence circuit 40. Likewise, AND circuit 48 produces an output signal only when the input signals on lines 46, 60 and 66 are simultaneously of the same phase and voltage level. The waveform N of FIGURE 2 clearly illustrates the signal produced in the output of the coincidence circuit 48.

As was mentioned previously, the outputs from coincidence gates 40 and 48 are applied to the CLEAR and SET terminals of the bistable flip-flop circuit 70, respectively. Each time the AND gate 40 produces an output signal, the flip-flop is switched to its "0" state where it remains until switched to the "1" state by an output from the coincidence circuit 48. Waveform O illustrates the output from the CLEAR side of the flip-flop 70 appearing at junction 72. By comparing waveform O with waveform A it can be seen that the two are identical. Hence, the output from the CLEAR side of the flip-flop 70 is the modulating data signal which is desired.

In many applications it is desirable not only to recover the modulating data at the receiving point, but also to reconstruct the clock or carrier frequency. To accomplish this end, the modulator circuit of FIGURE 1 employs the two coincidence circuits 76 and 78 and the NOR circuit 84. In operation, the coincidence circuit 76, which is preferably NAND gate, receives as inputs thereto the output from the SET side of the flip-flop 70 (waveform P) and the output from the inverter 26 (waveform H). NAND gate will produce a positive output only when both inputs thereto are of negative polarity. The waveform resulting at the output of NAND circuit 76 is represented by waveform R in FIGURE 2. In a similar fashion, the NAND gate 78 receives as input from inverter 18 and the output from the CLEAR side of flip-flop 70. Hence, NAND gate 78 produces a positive output only when waveforms G and O are of negative polarity. This waveform is illustrated by Q in FIGURE 2. Waveforms Q and R are ORed together in network 84. The NOR circuit 84 functions in a conventional manner to produce a negative output signal when either one of its two input terminals are of positive polarity. Waveform S in FIGURE 2 illustrates the shape of the signals appearing at the output of NOR circuit 84. By comparing this waveform B, it can be seen that the two are identical such that the carrier signal is also available as an output from the demodulator of FIGURE 1.

The waveforms of FIGURE 2 are based on the assumption that no errors are generated due to delay distortion during the transmission of the phase modulated carrier to the receiving site. If the waveform G should undergo distortion such that the bit period is slightly greater or slightly less than the desired carrier frequency in cycles per second, it can be shown that the circuits of the preferred embodiment will function to eliminate 50% of the errors which would otherwise result when complete coincidence in gates 40 and 48 over an entire bit period can not occur due to distortion. In FIGURE 2, the dashed lines are used to illustrate the foregoing. If it is assumed that the received waveform G has undergone delay distortion during transmission such that the signal is expanded or shortened as indicated by the dashed lines, by examining waveforms M and N it can be seen that waveform M is not affected by the error, but that waveform N is affected. Hence, the effect of the two errors assumed in waveform G only caused a single error to appear in the data output.

Because in all cases the error due to delay distortion will produce a signal at the outputs of gates 40 and 48 which is of substantially shorter duration that the normal carrier frequency, it is a relatively simple matter to provide discrimination to thereby prevent the "runt" pulse from triggering the flip-flop 70. Specifically, by inserting the capacitors 94 and 96 between the output terminals of gates 40 and 48 and ground, the signals M and N are integrated. Then, if the switching threshold of the flip-flop 70 is properly adjusted, the spike produced by the error signal will be insufficient to trigger the flip-flop. Hence, the assumed errors in no way affect the resulting data pattern appearing at the output terminal 72.

What is claimed is:

1. A demodulator for recovering digital data from a received phase modulated carrier signal comprising (a) means 14, 16, 18 for receiving an incoming phase modulated carrier wave signal;

(b) first 40 and second 48 coincidence circuits having a plurality of input terminals and an output terminal;

(c) first 28 and second 32 delay means serially connected between the output 22 of said receiving means and a first input terminal 54 of said first coincidence circuit;

(d) means 68 connecting the output of said receiving means directly to a second of said plurality of input terminals of said first coincidence circuit;

(e) means 38 for applying the output from only said first delay means to a third of said plurality of input terminals of said first coincidence circuit;

(f) inverter means 26, 44, and 58 connected between said first, second and third input terminals of said first coincidence circuit and first, second and third input terminals of said second coincidence circuit;

(g) a bistable circuit 70 having a pair of input terminals connected individually to the output terminals of said first 40 and second 48 coincidence circuits, and a pair of output terminals, 72 and 74, the arrangement being such that the true and complement signal representations of the modulating digital data results at the first and second outputs of said bistable circuit, respectively.

2. Apparatus as in claim 1 and further including carrier signal recovering means connected to the said pair of output terminals and to the output of said receiving and shaping means for recovering the carrie signal.

3. Apparatus as in claim 1 wherein said means for receiving an incoming phase modulated carrier wave signal includes signal filtering means for attenuating components of said incoming signal which are above a predetermined frequency value and amplifying and limiting means for shaping said incoming signal into pulses having abrupt leading and trailing edges.

4. Apparatus as in claim 1 wherein said first and second coincidence circuits are AND gates.

5. Apparatus as in claim 1 wherein the combined delay period of said first and second delay means is approximately equal to one-half cycle of said carrier signal.

6. Apparatus as in claim 2 wherein said clock signal recovering means includes (a) third and fourth coincidence circuits, each having a pair of input terminals and an output terminal;

(b) means connecting said pair of input terminals on said third coincidence circuit to the output of said receiving and shaping means and to the first output terminal of said bistable circuit, respectively;

(c) means connecting said pair of input terminals on said fourth coincidence circuit to the second output terminal of said bistable circuit and to the second input terminal of said second coincidence circuit, respectively; and (d) means for combining the signals appearing on the output terminals of said third and fourth coincidence circuit.

7. Apparatus as in claim 6 wherein said third and fourth coincidence circuits are NAND gates and wherein said last named means is a NOR gate.

8. A demodulator for recovering phase modulated digital data from a received modulated carrier signal comprising:

(a) means 10 and 18 for receiving and shaping an incoming phase modulated carrier wave signal;

(b) delay means 28 and 32 connected to introduce a predetermined delay into the output from said receiving and shaping means;

(c) first 40 and second 48 coincidence circuits each having three input terminals and an output terminal;

(d) means 68 connected the output from receiving and shaping means to a first of said three input terminals of said first coincidence circuit;

(e) means 54 and 38 connecting the delayed output from said delay means to the second and third input terminals of said first coincidence circuit;

(f) means 62 and 66 for applying the inverted output from said receiving and shaping means to the first said three input terminals of said second coincidence circuit;

(g) means 46 and 60 for applying the inverted output from said delay means to the second and third of said three input terminals of said second coincidence circuit 48;

(h) a bistable circuit 70 having a pair of input terminals and a pair of output terminals 72 and 74;

(i) means connecting said output terminals of said first and second coincidence circuits individually to said pair of input terminals of said bistable circuit;

(j) third 78 and fourth 76 coincidence circuits each having a pair of input terminals and at output terminal;

(k) means connecting said pair of output terminals of said bistable circuit to one of said pair of input terminals on said third and fourth coincidence circuits;

(l) means 22, 24, 26, 88 connecting the output from said receiving and shaping means to the other input terminal on said third coincidence circuit and the inverted output from said receiving and shaping means to the other input terminal of said fourth coincidence circuits; and (m) means 84 for combining the outputs from said third and fourth coincidence circuits to reconstruct said carrier signal.

References Cited

UNITED STATES PATENTS

| | | | |
|---|---|---|---|
| 3,271,750 | 9/1966 | Padalino | 329—104 X |
| 3,381,220 | 4/1968 | Burr | 329—110 X |

ROY LAKE, Primary Examiner

L. J. DAHL, Assistant Examiner

U.S. Cl. X.R.

329—104